(12) United States Patent
Zoitos et al.

(10) Patent No.: US 8,551,897 B2
(45) Date of Patent: Oct. 8, 2013

(54) INORGANIC FIBER

(75) Inventors: Bruce K. Zoitos, Williamsville, NY (US); Michael J. Andrejcak, Niagara Falls, NY (US); Paul M. Boymel, Amherst, NY (US)

(73) Assignee: Unifrax I LLC, Tonawanda, NY (US)

( * ) Notice: Subject to any disclaimer, the term of this patent is extended or adjusted under 35 U.S.C. 154(b) by 228 days.

(21) Appl. No.: 13/012,315

(22) Filed: Jan. 24, 2011

(65) Prior Publication Data

US 2011/0118102 A1    May 19, 2011

Related U.S. Application Data (63) Continuation of application No. 11/479,549, filed on Jun. 30, 2006, now Pat. No. 7,887,917.

(60) Provisional application No. 60/695,818, filed on Jun. 30, 2005.

(51) Int. Cl.
*B32B 17/06*     (2006.01)
*C04B 41/50*     (2006.01)

(52) U.S. Cl.
USPC .............. 501/35; 501/36; 501/73; 501/95.1; 501/123; 501/127; 428/367; 428/391; 428/392; 428/375

(58) Field of Classification Search
USPC ...... 501/35, 36, 73, 95.1, 123, 127; 428/364, 428/392, 367
See application file for complete search history.

(56) References Cited

U.S. PATENT DOCUMENTS

| | | | |
|---|---|---|---|
| 2,576,312 | A | 11/1951 | Minnick |
| 2,690,393 | A | 9/1954 | McGarvey |
| 2,699,415 | A | 1/1955 | Nachtman |
| 3,112,184 | A | 11/1963 | Hollenbach |
| 3,380,818 | A | 4/1968 | Smith |
| 3,383,275 | A | 5/1968 | Croop et al. |
| 3,455,731 | A | 7/1969 | Nielsen et al. |
| 3,469,729 | A | 9/1969 | Grekila et al. |
| 3,597,179 | A | 8/1971 | Simmons |
| 3,783,092 | A | 1/1974 | Majumdar |

(Continued)

FOREIGN PATENT DOCUMENTS

| | | |
|---|---|---|
| EP | 0132078 | 1/1985 |
| EP | 0142715 | 5/1985 |

(Continued)

OTHER PUBLICATIONS

Non-final Office Office Action for Japanese Patent Application No. 2009-518078 corresponding to U.S. Appl. No. 13/012,315, mailing date Apr. 1, 2011.

(Continued)

*Primary Examiner* — Jill Gray
(74) *Attorney, Agent, or Firm* — Curatolo Sidoit Co., LPA; Joseph G. Curatolo; Salvatore A. Sidoti (57) ABSTRACT

Provided are inorganic fibers containing calcium and alumina as the major fiber components. According to certain embodiments, the inorganic fibers containing calcia and alumina are provided with a coating of a phosphorous containing compound on at least a portion of the fiber surfaces. Also provided are methods of preparing the coated and non-coated inorganic fibers and of thermally insulating articles using thermal insulation comprising the inorganic fibers.

10 Claims, 6 Drawing Sheets

(56) References Cited

U.S. PATENT DOCUMENTS

| | | | |
|---|---|---|---|
| 3,788,885 | A | 1/1974 | Birchall et al. |
| 3,804,608 | A | 4/1974 | Gaskell et al. |
| 3,804,646 | A | 4/1974 | Dumbaugh, Jr. |
| 3,887,386 | A | 6/1975 | Majumdar |
| 3,899,342 | A | 8/1975 | Birchall et al. |
| 3,900,329 | A | 8/1975 | Grubb et al. |
| 3,992,498 | A | 11/1976 | Morton et al. |
| 4,037,015 | A | 7/1977 | Koike et al. |
| 4,104,355 | A | 8/1978 | Dunn et al. |
| 4,194,914 | A | 3/1980 | Moriya et al. |
| 4,358,500 | A | 11/1982 | George et al. |
| 4,375,493 | A | 3/1983 | George et al. |
| 4,382,104 | A | 5/1983 | Smith et al. |
| 4,396,661 | A | 8/1983 | George et al. |
| 4,428,999 | A | 1/1984 | George et al. |
| 4,507,355 | A | 3/1985 | George et al. |
| 4,547,403 | A | 10/1985 | Smith |
| 4,563,219 | A | 1/1986 | George et al. |
| 4,604,097 | A | 8/1986 | Graves et al. |
| 4,613,577 | A | 9/1986 | Tagai et al. |
| 4,659,610 | A | 4/1987 | George et al. |
| 4,673,594 | A | 6/1987 | Smith |
| 4,735,857 | A | 4/1988 | Tagai et al. |
| 4,737,192 | A | 4/1988 | Smith |
| 4,820,573 | A | 4/1989 | Tagai et al. |
| 4,830,989 | A | 5/1989 | Trivedi et al. |
| 4,933,307 | A | 6/1990 | Marshall et al. |
| 5,108,957 | A | 4/1992 | Cohen et al. |
| 5,145,734 | A | 9/1992 | Ito et al. |
| 5,221,558 | A | 6/1993 | Sonuparlak et al. |
| 5,223,336 | A | 6/1993 | Griffith et al. |
| 5,250,488 | A | 10/1993 | Thelohan et al. |
| 5,332,699 | A | 7/1994 | Olds et al. |
| 5,346,575 | A | 9/1994 | Griffith et al. |
| 5,346,868 | A | 9/1994 | Eschner |
| 5,371,050 | A | 12/1994 | Belitskus et al. |
| 5,480,676 | A | 1/1996 | Sonuparlak et al. |
| 5,486,232 | A | 1/1996 | Griffith et al. |
| 5,591,516 | A | 1/1997 | Jaco et al. |
| RE35,557 | E | 7/1997 | Thelohan et al. |
| 5,714,421 | A | 2/1998 | Olds et al. |
| 5,858,465 | A | 1/1999 | Hunt et al. |
| 5,874,375 | A | 2/1999 | Zoitos et al. |
| 5,955,389 | A | 9/1999 | Jubb |
| 5,962,354 | A | 10/1999 | Fyles et al. |
| 5,968,648 | A | 10/1999 | Rapp et al. |
| 5,994,247 | A | 11/1999 | Jubb et al. |
| 5,998,315 | A | 12/1999 | Jubb |
| 6,013,592 | A | 1/2000 | Merrill et al. |
| 6,036,762 | A | 3/2000 | Sambasivan |
| 6,037,288 | A | 3/2000 | Robinson et al. |
| 6,180,546 | B1 | 1/2001 | Jubb et al. |
| 6,309,994 | B1 | 10/2001 | Marra et al. |
| 6,458,436 | B1 | 10/2002 | Hansen et al. |
| 6,461,415 | B1 | 10/2002 | Sambasivan et al. |
| 6,517,906 | B1 | 2/2003 | Economy et al. |
| 6,652,950 | B2 | 11/2003 | Barney et al. |
| 6,716,407 | B2 | 4/2004 | Davis et al. |
| 6,855,298 | B2 | 2/2005 | Teneyck |
| 6,897,173 | B2 | 5/2005 | Bernard et al. |
| 2002/0022567 | A1 | 2/2002 | Li et al. |
| 2002/0032116 | A1 | 3/2002 | Jubb et al. |
| 2002/0107133 | A1 | 8/2002 | Troczynski et al. |
| 2003/0049329 | A1 | 3/2003 | Lee et al. |
| 2003/0138673 | A1 | 7/2003 | Sambasivan et al. |
| 2003/0162019 | A1 | 8/2003 | Zoitos et al. |
| 2004/0011245 | A1 | 1/2004 | Sambasivan et al. |
| 2005/0032620 | A1 | 2/2005 | Zoitos et al. |
| 2005/0079970 | A1 | 4/2005 | Otaki et al. |

FOREIGN PATENT DOCUMENTS

| | | | |
|---|---|---|---|
| EP | 0146398 | 6/1985 | |
| EP | 0155550 | 9/1985 | |
| EP | 178688 | 4/1986 | |
| EP | 178689 | 4/1986 | |
| EP | 0302465 | 2/1989 | |
| EP | 0417493 | 5/1991 | |
| EP | 0427873 | 5/1991 | |
| EP | 0539342 | 4/1993 | |
| EP | 0834489 | 4/1998 | |
| EP | 1086936 | 3/2001 | |
| EP | 132687 | 7/2003 | |
| GB | 520247 | 4/1940 | |
| GB | 1360197 | 7/1974 | |
| GB | 1360198 | 7/1974 | |
| GB | 1360199 | 7/1974 | |
| GB | 1360200 | 7/1974 | |
| GB | 2383793 | 7/2003 | |
| JP | 05-515307 A | 5/2005 | |
| JP | 06-272116 A | 10/2006 | |
| JP | 07-033546 A | 2/2007 | |
| JP | 07-524769 A | 8/2007 | |
| JP | 07-303011 A | 11/2007 | |
| JP | 2007-303011 A | 11/2007 | |
| WO | WO 85/02393 | 6/1985 | |
| WO | WO 85/02394 | 6/1985 | |
| WO | WO 89/12032 A2 | 12/1989 | |
| WO | WO 8912032 A2 * | 12/1989 | ............... C03C 13/00 |
| WO | WO 92/07801 | 5/1992 | |
| WO | WO 92/09536 | 6/1992 | |
| WO | WO 93/15028 | 8/1993 | |
| WO | WO 94/15883 | 7/1994 | |
| WO | WO 96/05147 | 2/1996 | |
| WO | WO 98/32606 | 7/1998 | |
| WO | WO 98/51981 | 11/1998 | |
| WO | WO 02/16263 | 2/2002 | |
| WO | WO 03/059835 A1 | 7/2003 | |

OTHER PUBLICATIONS

Translation of the pertinent part of non-final Office Office Action for Japanese Patent Application No. 2009-518078 corresponding to U.S. Appl. No. 13/012,315, mailing date Apr. 1, 2011.

Shyu, Jiin-Jyh and Wu, Jenn-Ming, Effect of $TiO_2$ addition on the nucleation of apatite in an $MgO-CaO-SiO-P_2O_5$ glass, Journal of Materials Science Letters, vol. 10, 1991.

Supplementary European Search Report (EPO Form 1503 03 82 (P04C04)) for European Patent Application No. EP 06 786 131.0 corresponding to U.S. Appl. No. 11/479,549, mailing date Apr. 8, 2010.

Wallenburger et al. "Inviscid melt spinning: As-spun crystalline alumina fibers", J. Mater. Res., vol. 5, No. 11, Nov. 1990.

International Search Report, Form PCT/ISA/210, and Written Opinion, Form PCT/ISA/237 for PCT International Patent Application No. PCT/US2006/025840, 2009.

* cited by examiner

FIG 9D

INORGANIC FIBER

CROSS REFERENCE TO RELATED APPLICATIONS

This application is a continuation application of U.S. Ser. No. 11/479,549 filed on Jun. 30, 2006 which claims the benefit of the filing date under 35 U.S.C. §119(e) of U.S. Provisional Application Ser. No. 60/695,818 filed on Jun. 30, 2005, both of which are hereby incorporated by reference in their entireties.

TECHNICAL FIELD

A high temperature resistant inorganic fiber useful as a thermal, electrical, or acoustical insulating material is provided, which has a use temperature of 1100° C. or greater. The high temperature resistant inorganic fiber is easily manufacturable, exhibits low shrinkage after prolonged exposure to the use temperature, retains good mechanical strength after exposure to the use temperature, and is soluble in physiological fluids.

BACKGROUND

The insulation material industry has determined that it is desirable to utilize fibers in thermal and acoustical insulating applications, which are not durable in physiological fluids, that is, fiber compositions which exhibit a low biopersistence. While candidate materials have been proposed, the use temperature limit of these materials have not been high enough to accommodate many of the applications to which high temperature resistant fibers, including vitreous fibers and ceramic fibers, are applied. Many compositions within the synthetic vitreous fiber family of materials have been proposed which are non-durable or decomposable in a physiological medium.

The high temperature resistant fibers should also exhibit minimal linear shrinkage at expected exposure temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the fibers have mechanical strength characteristics during and following exposure to the use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. In general, inorganic fibers that exhibit both high temperature resistance and non-durability in physiological fluids also exhibit a high degree of after service friability. This results in the fiber lacking the strength or mechanical integrity after exposure to the service temperature, to be able to provide the necessary structure to accomplish its insulating purpose.

Thus, it is still desirable to produce an improved inorganic fiber composition that is readily manufacturable from a fiberizable melt of desired ingredients, which exhibits low shrinkage during and after exposure to service temperatures of 1100° C. or greater, which exhibits low brittleness after exposure to the expected use temperatures, and which maintains mechanical integrity after exposure to use temperatures of 1100° C. or greater.

SUMMARY

A high temperature resistant inorganic fiber that is useful as a thermal, electrical or acoustical insulating material is provided. The inorganic fiber has a use temperature of 1100° C. and greater. The high temperature resistant inorganic is fiber is easily manufacturable from a melt of fiber ingredients, exhibits low linear shrinkage, retains good mechanical strength and integrity after exposure to the use temperature, and yet is soluble in physiological fluids.

At least 90 weight percent of the inorganic fiber comprises the fiberization product of greater than 50 weight percent calcia and greater than 0 to less than 50 weight percent alumina.

Also provided is a process for the production of an inorganic fiber, the process comprises forming a melt with ingredients comprising calcia and alumina, and producing fibers from the melt, wherein at least 90 weight percent of said ingredients comprise, in total, greater than 50 weight percent calcia and greater than 0 to less than 50 weight percent alumina.

A thermal insulation article is additionally provided, the thermal insulation article comprises inorganic fibers comprising a fiberization product, wherein at least 90 weight percent of the fiberization product comprises greater than 50 weight percent calcia and greater than 0 to less than 50 weight percent alumina.

A method of insulating an article is further provided, the method comprises disposing on, in, near or around the article, a thermal insulation material comprising inorganic fibers comprising a fiberization product, wherein at least 90 weight percent of the fiberization product comprises greater than 50 weight percent calcia and greater than 0 to less than 50 weight percent alumina.

Also provided is an inorganic fiber comprising calcia and alumina as the major fiber components and having a phosphorous containing compound deposited thereon, wherein at least about 90 weight percent of said fiber comprises the fiberization product comprising calcia and alumina, and about 10 weight or less percent impurities, and wherein at least a portion of the fiber surface is coated with a phosphorous containing compound.

According to certain embodiments, at least about 90 weight percent of the fiberization product comprises about 20 to about 50 weight percent calcia and about 50 to about 80 weight percent alumina.

A process for preparing a low shrinkage, high temperature resistant, non-durable vitreous inorganic fiber having a use temperature of 1100° C. or greater and having a phosphorous containing compound coating is also provided, the process comprises forming a melt with ingredients comprising, in total, at least 90 weight percent calcia and alumina, producing fibers from the melt, and applying a coating of a phosphorous containing compound to at least a portion of the surfaces of said fibers.

A thermal insulation article is additionally provided, the thermal insulation article comprises inorganic fibers comprising a fiberization product, wherein at least 90 weight percent of the fiberization product comprises calcia and alumina, and about 10 weight percent or less impurities, and wherein at least a portion of the fiber surface is coated with a phosphorous containing compound.

According to certain embodiments, said fibers of the thermal insulation material comprise a fiberization product, wherein at least 90 weight percent of the fiberization product comprises from about 20 to about 50 weight percent calcia and about 50 to about 80 weight percent alumina.

A method of insulating an article with thermal insulation is also provided, the method comprising disposing on, in, near, or around the article, a thermal insulation material comprising low shrinkage, high temperature resistant, non-durable vitreous inorganic fibers having a service temperature of 1100° C. or greater, said inorganic fibers of said thermal insulation material comprising a fiberization product, wherein at least 90 weight percent of the fiberization product comprises calcia and alumina, and about 10 weight percent or less impurities, and wherein at least a portion of the surface of each fiber is coated with a phosphorous containing compound.

A method for reducing the hydration of inorganic fibers in a liquid is further provided, the method comprises adding to said liquid an effective amount of a hydration retarder.

A method for preparing a low shrinkage thermal insulation board resistant to 1100° C. or greater is also provided, the method comprises forming a slurry with inorganic fibers, a hydration retarder, and a liquid; removing the liquid from the slurry to form a board; and drying the insulation board.

A low shrinkage thermal insulation board resistant to 1100° C. or greater is additionally provided, the thermal insulation board prepared by forming a slurry with inorganic fibers, a hydration retarder, and a liquid; removing a liquid from the slurry a wet board; and drying the insulation board.

DETAILED DESCRIPTION

An inorganic fiber that is useful as a thermal, electrical, and acoustical insulation material is provided. The inorganic fiber has a continuous service or use temperature of 1100° C. or greater. According to certain embodiments, the vitreous inorganic fiber has a continuous service or use temperature of 1260° C. or greater The inorganic fiber is non-durable in physiological fluids. By "non-durable" in physiological fluids it is meant that the inorganic fiber at least partially dissolves in such fluids, such as simulated lung fluid, during in vitro tests. The inorganic vitreous fiber also exhibits a linear shrinkage, as determined by the test method described below, of less than about 5 percent in response to exposure to a use temperature of 1260° C. for 24 hours.

The low shrinkage, high temperature resistant inorganic fiber comprises the fiberization product of a melt containing calcia and alumina as the primary constituents. The inorganic fiber comprising the fiberization product of calcia and alumina is referred to as a "calcium-aluminate" fiber.

According to certain embodiments, the calcium-aluminate fiber comprises the fiberization product of greater than 50 weight percent calcia and greater than 0 to less than 50 weight percent alumina.

According to other embodiments, the calcium-aluminate fiber comprises the fiberization product of greater than 50 to about 60 weight percent calcia and from about 40 to less than 50 weight percent alumina.

According to other embodiments, the calcium-aluminate fiber comprises the fiberization product comprising about greater than 50 to about 80 weight percent calcia and about 20 to less than 50 weight percent alumina.

According to other embodiments, the calcium-aluminate fiber comprises the fiberization product comprising about 60 to about 80 weight percent calcia and about 20 to about 40 weight percent alumina.

According to other embodiments, the calcium-aluminate fiber comprises the fiberization product of greater than 50 to about 70 weight percent calcia and about 30 to less than 50 weight percent alumina.

The raw materials for the melt may be obtained from any suitable source capable of supplying the required chemistry and purity. Without limitation, suitable sources of calcium oxide include calcium-aluminate cement having a desired ratio of $CaO/Al_2O_3$, lime, limestone, and quicklime. Without limitation, suitable sources of alumina are those having the required purity and which may be blended as needed with the CaO-bearing materials to achieve the desired chemistry.

In addition to calcia and alumina, the calcium-aluminate fiber may contain up to about 10 weight percent of impurities. Such impurities may include iron oxides. If iron oxide impurities are present in the fiberization melt from the starting raw materials, they are usually present in an amount of less than about 1 weight percent, calculated as $Fe_2O_3$.

According to certain embodiments, the impurities may contain up to 10 percent by weight of silica, based on the total weight of the fiber. However, in certain embodiments the calcium-aluminate fibers may contain less than about 5 weight percent silica, or even as low as about 2 weight percent silica or less.

Linear shrinkage of an inorganic fiber is a good measure of a fiber's high temperature resistance or of its performance at a particular continuous service or use temperature. The calcium-aluminate fibers exhibit a linear shrinkage after exposure to a service temperature of 1260° C. for 24 hours of 5 percent or less. Thus, the calcium-aluminate fibers are useful for thermal insulating applications at continuous service or operating temperatures of at least 1200° C. or greater. Furthermore, it has been found that the calcium-aluminate fibers do not melt until they are exposed to a temperature of 1320° C. or greater.

A method for preparing a low shrinkage, high temperature resistant, non-durable calcium-aluminate fiber having a use temperature of at least 1100° C. or greater is provided. The method of forming the calcium-aluminate fiber includes forming a material melt of ingredients comprising calcia and alumina, and forming fibers from the melt of ingredients. The method of forming the calcium-aluminate fiber includes forming a material melt of ingredients where at least 90 weight percent of the ingredients comprise, in total, calcia and alumina. The calcium-aluminate fibers may be produced from the melt of ingredients by standard melt spinning or fiber blowing techniques.

According to certain embodiments, the method of forming the calcium-aluminate fiber includes forming a material melt of ingredients where at least 90 weight percent of the ingredients comprise, in total, greater than 50 weight percent calcia and greater than 0 to less than 50 weight percent alumina, and forming fibers from the melt of ingredients. It is understood that not each ingredient of the material melt must possess this calcia:alumina ratio, or any of the other calcia:alumina ratios described herein. Rather, the total amount of calcia and alumina contained in the material melt of ingredients comprises this ratio, or any of the calcia:alumina ratios described herein. Thus, in this embodiment, and the embodiments that follow, each ingredient need not have calcia and alumina in the disclosed ranges, but that total of such ingredients should comprise the disclosed ranges.

According to other embodiments, the method of forming the calcium-aluminate fiber includes forming a material melt of ingredients where at least 90 weight percent of the ingredients comprise, in total, from greater than 50 to about 60 weight percent calcia and from about 40 to less than 50 weight percent alumina, and forming fibers from the melt of ingredients.

According to other embodiments, the method of forming the calcium-aluminate fiber includes forming a material melt of ingredients where at least 90 weight percent of the ingredients comprise, in total, about greater than 50 to about 80 weight percent calcia and about 20 to less than 50 weight percent alumina.

According to other embodiments, the method of forming the calcium-aluminate fiber includes forming a material melt of ingredients where at least 90 weight percent of the ingredients comprise, in total, about 60 to about 80 weight percent calcia and about 20 to about 40 weight percent alumina.

According to other embodiments, the method of forming the calcium-aluminate fiber includes forming a material melt of ingredients where at least 90 weight percent of the ingredients comprise, in total, greater than 50 to about 70 weight percent calcia and about 30 to less than 50 weight percent alumina.

The viscosity of the material melt of ingredients may optionally be controlled by the presence of viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size, pour rate, melt temperature, residence time, and the like.

As described above, the calcium-aluminate fiber may be prepared by fiber blowing or fiber spinning techniques. A suitable fiber blowing technique includes the steps of mixing the starting raw materials containing calcia and alumina together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the calcium-aluminate fibers.

A suitable fiber spinning technique includes the steps of mixing the starting raw materials containing calcia and alumina together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

A method of insulating an article of using a thermal insulation containing the calcium-aluminate fibers is also provided. The method of insulating an article includes disposing on, in, near, or around the article to be insulated, a thermal insulation material that contains the calcium-aluminate fibers. The calcium-aluminate fibers included in the thermal insulation material are those fibers in which at least 90 weight percent of the fiber comprises the fiberization product of greater than 50 weight percent calcia and greater than 0 to less than 50 weight percent alumina.

According to certain embodiments, the calcium-aluminate fibers included in the thermal insulation material are those fibers in which at least 90 weight percent of the fiber comprises the fiberization product of greater than 50 to about 60 weight percent calcia and from about 40 to less than 50 weight percent alumina.

According to certain embodiments, the calcium-aluminate fibers included in the thermal insulation material are those fibers in which at least 90 weight percent of the fiber comprises the fiberization product of about greater than 50 to about 80 weight percent calcia and about 20 to less than 50 weight percent alumina.

According to certain embodiments, the calcium-aluminate fibers included in the thermal insulation material are those fibers in which at least 90 weight percent of the fiber comprises the fiberization product of about 60 to about 80 weight percent calcia and about 20 to about 40 weight percent alumina.

According to certain embodiments, the calcium-aluminate fibers included in the thermal insulation material are those fibers in which at least 90 weight percent of the fiber comprises the fiberization product of greater than 50 to about 70 weight percent calcia and about 30 to less than 50 weight percent alumina.

A calcium-aluminate fiber having a phosphorous containing compound deposited thereon is also provided. The calcium-aluminate fiber comprises the fiberization product of calcia and alumina, and contains less than about 10 weight percent impurities. The calcium-aluminate fiber is provided with a coating of a phosphorous containing compound on at least a portion of its exterior surface.

According to certain embodiments, at least about 90 weight percent of the coated calcium-aluminate fiber comprises the fiberization product of about 20 to about 50 weight percent calcia and about 50 to about 80 weight percent alumina.

According to other embodiments, at least about 90 weight percent of the coated calcium-aluminate fiber comprises the fiberization product of about 35 to about 50 weight percent calcia and about 50 to about 65 weight percent alumina.

According to further embodiments, at least about 90 weight percent of the coated calcium-aluminate fiber comprises the fiberization product of a melt comprising about 37 to about 50 weight percent calcia and about 50 to about 63 weight percent alumina.

According to certain embodiments, at least about 90 weight percent of the coated calcium-aluminate fiber comprises the fiberization product of greater than 50 weight percent calcia and greater than 0 to less than 50 weight percent alumina.

According to other embodiments, at least about 90 weight percent of the coated calcium-aluminate fiber comprises the fiberization product of greater than 50 to about 60 weight percent calcia and from about 40 to less than 50 weight percent alumina.

According to other embodiments, at least about 90 weight percent of the coated calcium-aluminate fiber comprises the fiberization product of about greater than 50 to about 80 weight percent calcia and about 20 to less than 50 weight percent alumina.

According to other embodiments, at least about 90 weight percent of the coated calcium-aluminate fiber comprises the fiberization product of about 60 to about 80 weight percent calcia and about 20 to about 40 weight percent alumina.

According to other embodiments, at least about 90 weight percent of the coated calcium-aluminate fiber comprises the fiberization product of greater than 50 to about 70 weight percent calcia and about 30 to less than 50 weight percent alumina.

According to further embodiments, at least about 95 weight percent of said coated fiber comprises the fiberization product of about 20 to about 50 weight percent calcia and about 50 to about 80 weight percent alumina.

According to other embodiments, at least about 95 weight percent of the coated calcium-aluminate fiber comprises the fiberization product of about 35 to about 50 weight percent calcia and about 50 to about 65 weight percent alumina.

According to further embodiments, at least about 95 weight percent of the coated calcium-aluminate fiber comprises the fiberization product of about 37 to about 50 weight percent calcia and about 50 to about 63 weight percent alumina.

While it is not necessary that the entire exterior surface area of the individual fibers be coated with a phosphorous containing compound, a sufficient portion of the surface area should be coated with the phosphorous compound coating to provide a calcium-aluminate fiber having a continuous use or service temperature of at least 1260° C.

The phosphorous containing compound precursor that is used to form the coating of the at least a portion of the surface of the calcium-aluminate fiber may include phosphoric acid in its various forms, such as a metaphosphoric acid, orthophosphoric acid, polyphosphoric acid, superphosphoric acid, any water soluble salt of phosphoric acid that includes the —$PO_4$ group, and mixtures thereof.

Metal phosphates are suitable for forming the coating of the surfaces of the calcium-aluminate fibers to increase the temperature resistance of the fibers. According to certain embodiments, the metal phosphates that may be utilized to coat the surfaces of the calcium-aluminate fibers include the alkali metal phosphates and the alkaline earth metal phosphates. Without limitation, suitable alkali metal phosphates may include lithium phosphates, sodium phosphates, and potassium phosphates. Without limitation, suitable alkaline earth metal phosphates include magnesium phosphate and calcium phosphate. Ammonium phosphate may also be used to coat the surfaces of the calcium-aluminate fiber.

The calcium-aluminate fibers having a phosphorous containing compound coating that is derived from a phosphorous containing compound precursor on at least a portion of the exterior fiber surfaces exhibit a linear shrinkage after exposure to a service temperature of 1260° C. for 24 hours of 5 percent or less. Thus, the coated calcium-aluminate fibers are useful for thermal insulating applications at continuous service or operating temperatures of at least 1260° C. or greater.

The method of forming the calcium-aluminate fiber includes forming a material melt of ingredients comprising calcia and alumina, and forming fibers from the melt of ingredients. A phosphorous containing compound to applied the at least a portion of the fiber surfaces. The phosphorous containing coating may be applied on at least a portion of the surfaces of the calcium-aluminate fibers either during the fiberization process, or after the fiberization process has been carried out. The calcium-aluminate fibers may be produced from the melt of ingredients by standard fiber spinning or fiber blowing techniques.

According to certain embodiments, the method of forming the calcium-aluminate fiber includes forming a material melt of ingredients wherein at least 90 weight percent of the ingredients comprise, in total, from about 20 to about 50 weight percent calcia and from about 50 to about 80 weight percent alumina, forming fibers from the melt of ingredients, and applying a phosphorous containing compound precursor to at least a portion of the fiber.

According to other embodiments, the method of forming the calcium-aluminate fiber includes forming a material melt of ingredients where at least 90 weight percent of the ingredients comprise, in total, from about 35 to about 50 weight percent calcia and about 50 to about 65 weight percent alumina, forming fibers from the melt of ingredients, and applying a phosphorous containing compound precursor to at least a portion of the fiber.

According to other embodiments, the method of forming the calcium-aluminate fiber includes forming a material melt of ingredients where at least 90 weight percent of the ingredients comprise, in total, from about 37 to about 50 weight percent calcia and about 50 to about 63 weight percent alumina, forming fibers from the melt of ingredients, and applying a phosphorous containing compound precursor to at least a portion of the fiber.

According to certain embodiments, the method of forming the calcium-aluminate fiber includes forming a material melt of ingredients where at least 90 weight percent of the ingredients comprise, in total, greater than 50 weight percent calcia and greater than 0 to less than 50 weight percent alumina, forming fibers from the melt of ingredients, and applying a phosphorous containing compound precursor to at least a portion of the fiber.

According to other embodiments, the method of forming the calcium-aluminate fiber includes forming a material melt of ingredients comprising, in total, from greater than 50 to about 60 weight percent calcia and from about 40 to less than 50 weight percent alumina, forming fibers from the melt of ingredients, and applying a phosphorous containing compound precursor to at least a portion of the fiber.

According to other embodiments, the method of forming the calcium-aluminate fiber includes forming a material melt of ingredients where at least 90 weight percent of the ingredients comprise, in total, about greater than 50 to about 80 weight percent calcia and about 20 to less than 50 weight percent alumina, forming fibers from the melt of ingredients, and applying a phosphorous containing compound precursor to at least a portion of the fiber.

According to other embodiments, the method of forming the calcium-aluminate fiber includes forming a material melt of ingredients where at least 90 weight percent of the ingredients comprise, in total, about 60 to about 80 weight percent calcia and about 20 to about 40 weight percent alumina, forming fibers from the melt of ingredients, and applying a phosphorous containing compound precursor to at least a portion of the fiber.

According to other embodiments, the method of forming the calcium-aluminate fiber includes forming a material melt of ingredients where at least 90 weight percent of the ingredients comprise, in total, greater than 50 to about 70 weight percent calcia and about 30 to less than 50 weight percent alumina, forming fibers from the melt of ingredients, and applying a phosphorous containing compound precursor to at least a portion of the fiber.

The viscosity of the material melt of ingredients may optionally be controlled by the presence of viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like. As described above, the calcium-aluminate fiber may be prepared by fiber blowing or fiber spinning techniques.

The coating containing a phosphorous compound may be applied to the exterior surfaces of the fiber either during the fiberization process, or after the calcium-aluminate fibers have been fiberized. It is useful to apply the coating of the phosphorous compound on the fibers surfaces during the fiberization process. According to this technique, the coating containing the phosphorous compound is sprayed onto the surfaces of the fibers at the point of fiberization with a suitable spray apparatus having a nozzle for discharging the coating composition onto the fibers. That is, the coating composition containing a phosphorous compound is applied to the fibers as the fibers are discharged from the molten mixture of ingredients.

The coating containing the phosphorous compound may also be applied to the fiber surfaces after completion of the fiberization process by a number of techniques including, without limitation, dipping, immersing, impregnating, soaking, or splashing the fibers with the coating composition containing a phosphorous compound.

A method of insulating an article is using thermal insulation containing coated calcium-aluminate fibers is also provided. The method of insulating an article includes disposing on, in, near, or around the article to be insulated, a thermal insulation material that contains phosphate coated calcium-aluminate fibers prepared in accordance with this process. The thermal insulation article comprises inorganic fibers comprising a fiberization product, wherein at least 90 weight percent of the fiberization product comprises calcia and alumina, and about 10 weight percent or less impurities, and wherein at least a portion of the fiber surface is coated with a phosphorous containing compound.

According to certain embodiments, the coated calcium-aluminate fibers included in the thermal insulation material comprise fibers which comprise a fiberization product, where at least 90 weight percent of the fiberization product comprises about 20 to about 50 weight percent calcia and about 50 to about 80 weight percent alumina.

According to other embodiments, the coated calcium-aluminate fibers included in the thermal insulation material comprise fibers which comprise a fiberization product, where at least 90 weight percent of the fiberization product comprises about 35 to about 50 weight percent calcia and about 50 to about 65 weight percent alumina.

According to further embodiments, the coated calcium-aluminate fibers included in the thermal insulation material comprise fibers which comprise a fiberization product, where at least 90 weight percent of the fiberization product comprises about 37 to about 50 weight percent calcia and about 50 to about 63 weight percent alumina.

According to certain embodiments, the coated calcium-aluminate fibers included in the thermal insulation material comprise fibers which comprise a fiberization product, where at least 90 weight percent of the fiberization product comprises greater than 50 weight percent calcia and greater than 0 to less than 50 weight percent alumina.

According to other embodiments, the coated calcium-aluminate fibers included in the thermal insulation material comprise fibers which comprise a fiberization product, where at least 90 weight percent of the fiberization product comprises greater than 50 to about 60 weight percent calcia and from about 40 to less than 50 weight percent alumina.

According to other embodiments, the coated calcium-aluminate fibers included in the thermal insulation material comprise fibers which comprise a fiberization product, where at least 90 weight percent of the fiberization product comprises greater than 50 to about 80 weight percent calcia and about 20 to less than 50 weight percent alumina.

According to other embodiments, the coated calcium-aluminate fibers included in the thermal insulation material comprise fibers which comprise a fiberization product, where at least 90 weight percent of the fiberization product comprises about 60 to about 80 weight percent calcia and about 20 to about 40 weight percent alumina.

According to other embodiments, the coated calcium-aluminate fibers included in the thermal insulation material comprise fibers which comprise a fiberization product, where at least 90 weight percent of the fiberization product comprises greater than 50 to about 70 weight percent calcia and about 30 to less than 50 weight percent alumina.

According to certain embodiments, the coated calcium-aluminate fibers included in the thermal insulation material comprise fibers which comprise a fiberization product, where at least 95 weight percent of the fiberization product comprises about 20 to about 50 weight percent calcia and about 50 to about 80 weight percent alumina.

According to other embodiments, the coated calcium-aluminate fibers included in the thermal insulation material comprise fibers which comprise a fiberization product, where at least 95 weight percent of the fiberization product comprises about 35 to about 50 weight percent calcia and about 50 to about 65 weight percent alumina.

According to further embodiments, the coated calcium-aluminate fibers included in the thermal insulation material comprise fibers which comprise a fiberization product, where at least 95 weight percent of the fiberization product comprises about 37 to about 50 weight percent calcia and about 50 to about 63 weight percent alumina.

Without being bound to any particular theory, the increased refractoriness of the phosphate coated calcium-aluminate fibers may be a result of the effect of the phosphate coating on the devitrification temperature of the calcium-aluminate fiber. That is, the phosphate coating appears to reduce the temperature at which the calcium-aluminate fiber undergoes devitrification. Uncoated calcium-aluminate fibers undergo devitrification at about 910° C. Between about 875° C. and 910° C., the uncoated calcium-aluminate fibers are subject to viscous creep, which results in excessive fiber shrinkage. Devitrification of a calcium-aluminate fiber coated with a phosphorous containing coating occurs at a temperature that is lower than 910° C., perhaps as low as 810° C. Thus, devitrification of the coated calcium-aluminate fiber at these lower temperatures substantially prevents fiber shrinkage through viscous creep.

EXAMPLES

The following examples are set forth to describe illustrative embodiments of the calcium-aluminate fibers in further detail and to illustrate the methods of preparing the inorganic fibers, preparing thermal insulating article containing the fibers and using the fibers as thermal insulation. However, the examples should not be construed as limiting the fiber, fiber containing articles, or the processes of making or using as thermal insulation in any manner.

Example 1

Calcium-aluminate fibers were produced from a melt of ingredients containing about 40 weight percent calcia and about 60 weight percent alumina by a fiber blowing process. A coating of sodium monophosphate was applied to the fibers by a spraying process.

A shrinkage pad was prepared by mixing the blown fibers, a phenolic binder, and water. The mixture of fibers, binder, and water was poured into a sheet mold and the water was allowed to drain through openings in the bottom of the mold. A 3 inch×5 inch test piece was cut from the pad and was used in the shrinkage testing. The length and width of the test pad was carefully measured. The test pad was then placed into a furnace and brought to a temperature of 1260° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements. The test pad comprising fibers manufactured from a melt of ingredients including about 40 weight percent calcia and about 60 weight percent alumina and which were coated with sodium monophosphate exhibited a linear shrinkage of less than 5 percent after exposure to a temperature of 1260° C. for 24 hours.

Example 2

Calcium-aluminate fibers were produced from a melt of ingredients containing about 37 weight percent calcia and about 63 weight percent alumina by a fiber blowing process. A coating of sodium monophosphate was applied to the fibers by a spraying process. The phosphate coated fibers were formed into a test pad and the shrinkage characteristics of the test pad were determined according to the methods described for Example 1. The test pad comprising fibers manufactured from a melt of ingredients including about 37 weight percent calcia and about 63 weight percent alumina and which were coated with sodium monophosphate exhibited a linear shrinkage of less than 5 percent after exposure to a temperature of 1260° C. for 24 hours.

Table I below includes a number of calcium-aluminate fibers produced in accordance with the present processes.

TABLE I

| Example | CaO | $Al_2O_3$ | $SiO_2$ | $Fe_2O_3$* | $P_2O_5$ | A/C Ratio |
|---|---|---|---|---|---|---|
| 3 | 42.1 | 55.8 | 1.6 | 0.35 | 0.05 | 1.33 |
| 4 | 32.7 | 65 | 1.8 | 0.36 | 0.05 | 1.02 |
| 5 | 32.1 | 64.6 | 1.6 | 0.35 | 1.18 | 2.01 |
| 6 | 47.8 | 48.4 | 2.17 | 0.37 | 0.9 | 1.01 |

TABLE I-continued

| Example | CaO | $Al_2O_3$ | $SiO_2$ | $Fe_2O_3$* | $P_2O_5$ | A/C Ratio |
|---|---|---|---|---|---|---|
| 7 | 35.9 | 61.9 | 1.6 | 0.34 | 0.06 | 1.72 |
| 8 | 35.8 | 61.2 | 1.6 | 0.35 | 0.86 | 1.71 |
| 9 | 46.4 | 51 | 1.9 | 0.35 | 0.03 | 1.10 |
| 10 | 46.6 | 50.3 | 1.9 | 0.36 | 0.55 | 1.08 |
| 11 | 53.18 | 44.02 | 1.91 | 0.02 | 0.26 | 1.21 |
| 12 | 47.8 | 46 | 4.56 | 0.36 | 0.05 | 1.04 |
| 13 | 47 | 48.94 | 2.84 | 0.02 | 0.13 | 0.96 |
| 14 | 46.08 | 49.29 | 2.71 | 0.03 | 0.56 | 0.93 |
| 15 | 42.86 | 53.43 | 2.67 | 0.02 | 0.04 | 0.8 |
| 16 | 42.74 | 52.47 | 2.81 | 0.02 | 0.18 | 0.81 |
| 17 | 40.6 | 56.18 | 2.61 | 0.02 | 0.06 | 0.72 |
| 18 | 40.19 | 55.72 | 2.76 | 0.02 | 0.21 | 0.72 |

*$P_2O_5$ in Table II refers to either the phosphorous containing compound coating on the calcium-aluminate fibers or incidental trace impurity from the raw materials.

The calcium-aluminate fibers set forth in Table 1 above were analyzed for linear shrinkage after exposure to a temperature of 1260° C. for 24 hours. The results of the fiber analysis are set forth in Table II below.

TABLE II

| Example | Phosphate Coating | Shrinkage at 1260° C. |
|---|---|---|
| 3 | NO | 38.5 |
| 4 | NO | 1.02 |
| 5 | YES | 0.55 |
| 6 | YES | 0.7 |
| 7 | NO | 2.9 |
| 8 | YES | 1.4 |
| 9 | NO | 40.6 |
| 10 | YES | 1.1 |
| 11 | YES | 3.69 |
| 12 | NO | 33.2 |
| 13 | NO | 40.88 |
| 14 | YES | 1.43 |
| 15 | NO | 9.62 |
| 16 | YES | 0.89 |
| 17 | NO | 1.56 |
| 18 | YES | 0.87 |

The durability of the calcium-aluminate fibers in physiological lung fluid was evaluated. The durability test measures the rate at which mass is lost from the fiber (ng/cm$^2$-hr) under conditions which simulate the temperature and chemical conditions found in the human lung. This test consists of exposing approximately 0.1 g of de-shotted fiber to a 0.3 ml/min flow of simulated lung fluid (SLF). The entire test system is maintained at 37° C., to simulate the temperature of the human body. Tests preferably last for between about two and four weeks.

After the SLF has flowed through the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study.

The composition for the simulated lung fluid, which was used to test the durability of the fiber compositions of the present invention:

| Constituent | Amount/Make-up |
|---|---|
| $NH_4Cl$ | 10.72 g/50 mL |
| NaCl | 135.6 g |
| $NaHCO_3$ | 45.36 g |
| $NaH_2PO_4 \cdot H_2O$ solution | 3.31 g/50 mL |

-continued

| Constituent | Amount/Make-up |
|---|---|
| Na$_3$C$_6$H$_5$O$_7$•H$_2$O solution | 1.18 g/50 mL |
| Glycine | 9.08 g |
| H$_2$SO$_4$ (1N solution) | 20.0 mL |
| CaCl$_2$ (2.75 wt. % solution) | 15.8 mL |
| Formaldehyde | 20.0 mL |

To approximately 18 liters of deionized water, sequentially add the above reagents in the amounts shown in the above table. Dilute the mixture to 20 liters with deionized water and continue to stir contents with magnetic stir bar or other suitable means for at least 15 minutes. The results of the durability testing are set forth in Table III below.

TABLE III

| Example | Heat Treatment (C. °) | Dissolution @ pH 7.4 ng/cm2-hr | Dissolution @ pH 4.5 ng/cm2-hr | Dissolution @ pH 7.4 ng/cm2-hr w/o phosphate or citrate |
|---|---|---|---|---|
| 3 | None | 23 | 32 | 18 |
| 6 | None | 12 | 50 | 17 |
| 11 | None | 9 | 83 | 20 |
| 12 | None | 13 | 38 | 14 |
| 15 | None | 21 | 21 | 15 |
| 16 | None | 14 | 90 | 22 |
| 3 | 850 | 19 | 59 | 23 |
| 6 | 850 | 29 | — | 15 |
| 11 | 850 | 17 | 55 | 20 |
| 12 | 850 | 9 | 280 | 9 |
| 15 | 850 | 54 | 202 | 66 |
| 16 | 850 | 92 | 178 | 23 |
| 3 | 1260 | — | 139 | 26 |
| 6 | 1260 | 40 | 260 | 40 |
| 11 | 1260 | 61 | 48 | 18 |
| 12 | 1260 | — | 180 | 31 |

Figure 1:
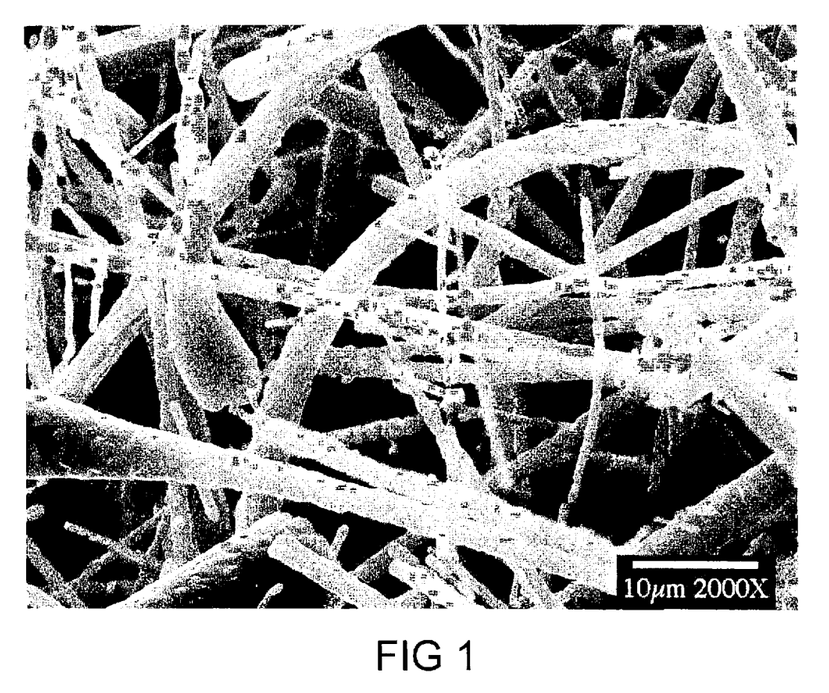
FIG. 1 is a scanning electron micrograph of an uncoated calcium-aluminate fiber comprising the fiberization product of about 65 weight percent alumina and about 33 weight percent calcia.
Figure 2:
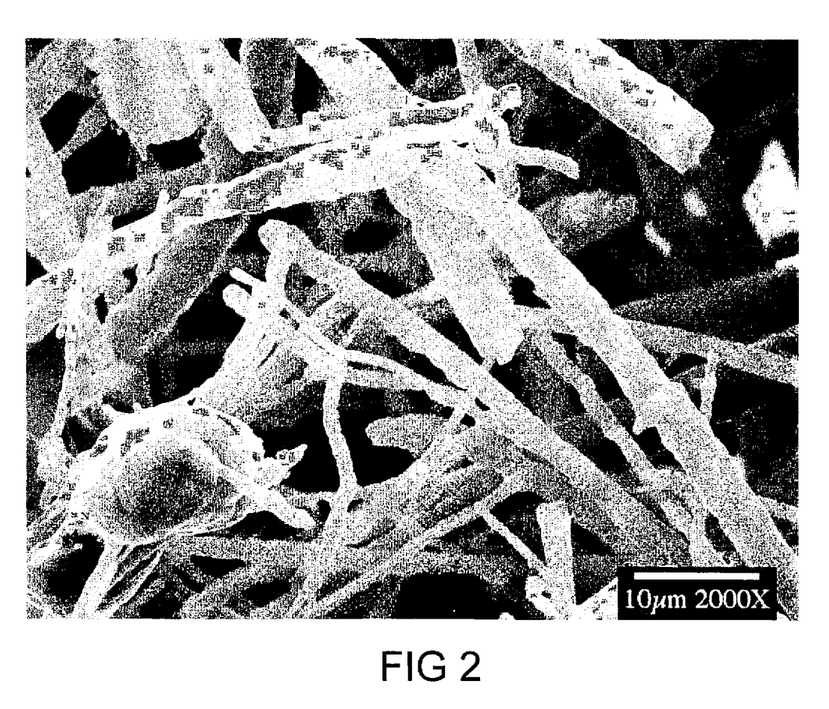
FIG. 2 is a scanning electron micrograph of a phosphate coated calcium-aluminate fiber comprising the fiberization product of about 65 weight percent alumina and about 33 weight percent calcia.
Figure 3:
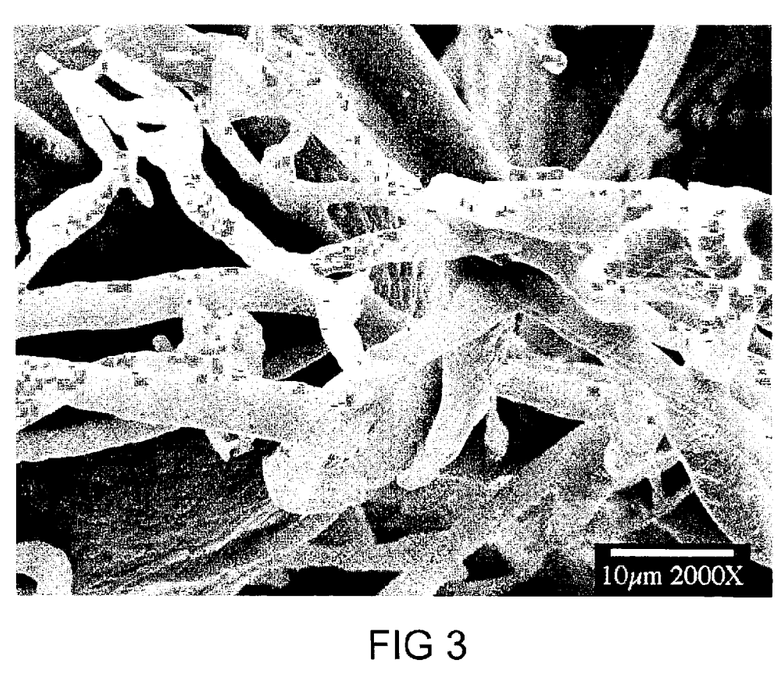
FIG. 3 is a scanning electron micrograph of an uncoated calcium-aluminate fiber comprising the fiberization product of about 55.8 weight percent alumina and about 42.1 weight percent calcia.
Figure 4:
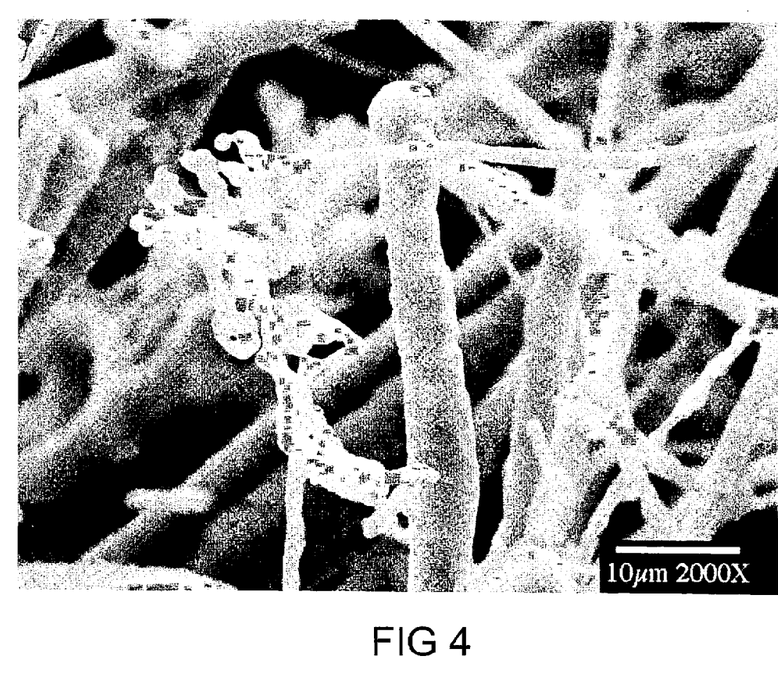
FIG. 4 is a scanning electron micrograph of a phosphate coated calcium-aluminate fiber comprising the fiberization product of about 55.8 weight percent alumina and about 42.1 weight percent calcia.
Figure 5:
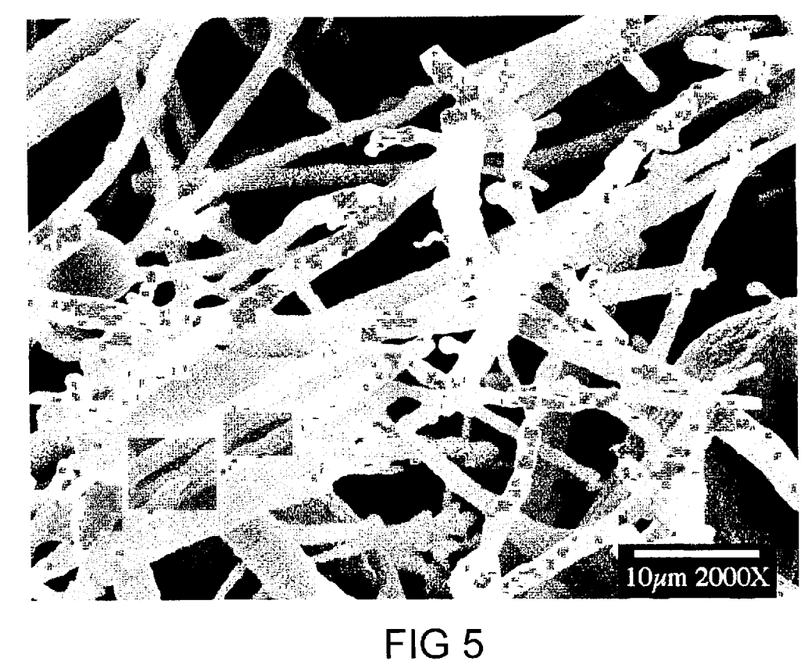
FIG. 5 is a scanning electron micrograph of an uncoated calcium-aluminate fiber comprising the fiberization product of about 43.5 weight percent alumina and about 53 weight percent calcia.
Figure 6:
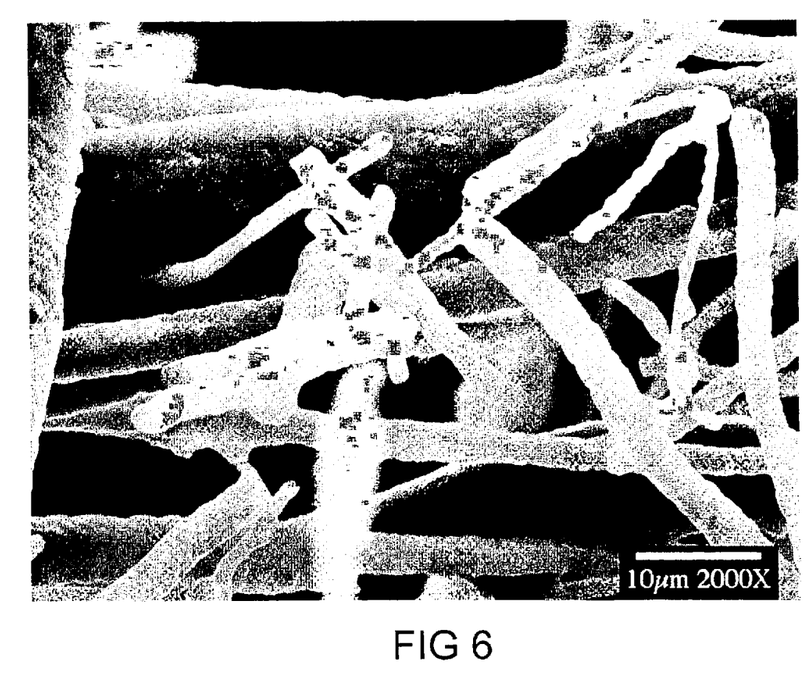
FIG. 6 is a scanning electron micrograph of a phosphate coated calcium-aluminate fiber comprising the fiberization product of about 43.5 weight percent alumina and about 53 weight percent calcia.
Figure 7:
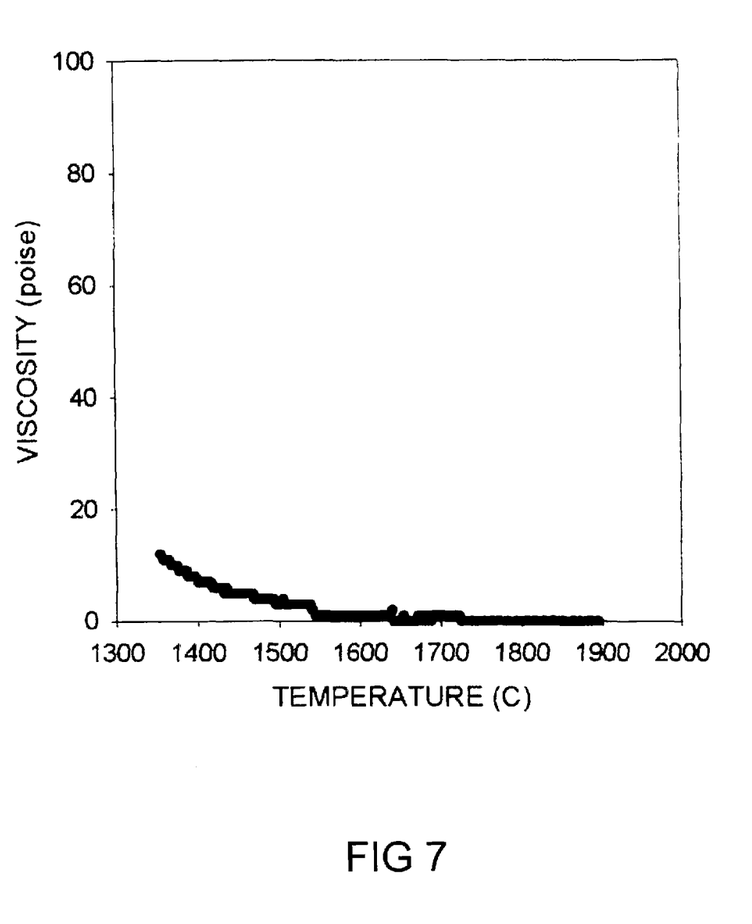
FIG. 7 is a viscosity vs. temperature curve for a calcium-aluminate fiber melt chemistry comprising about 55.8 weight percent alumina and about 42.1 weight percent calcia.
Figure 8A:
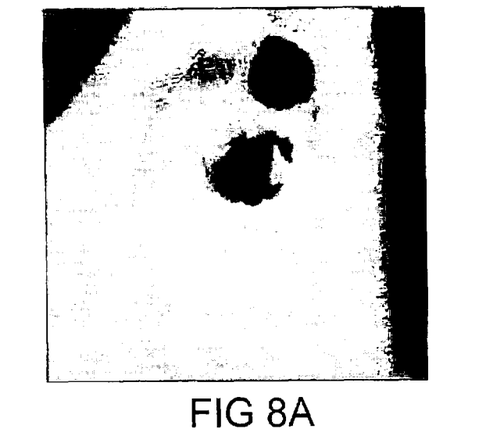
FIGS. 8A-8C are photographs of refractory ceramic fiber thermal insulation blankets after exposure to a $Na_2O$ flux.
Figure 8B:
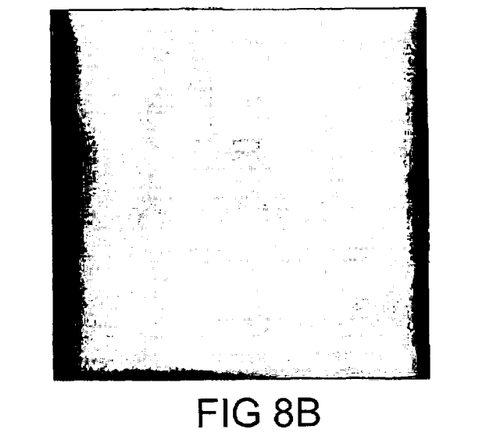
Figure 8C:
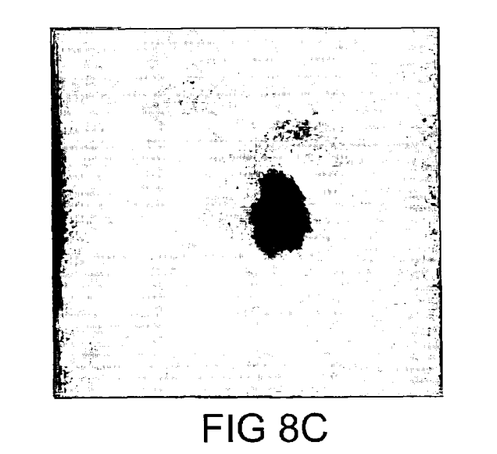
Figure 9A:
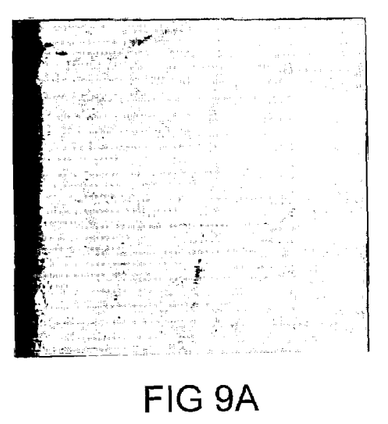
FIGS. 9A-9D are photographs of thermal insulation blankets comprising calcium-aluminate fibers after exposure to a $Na_2O$ flux.
Figure 9B:
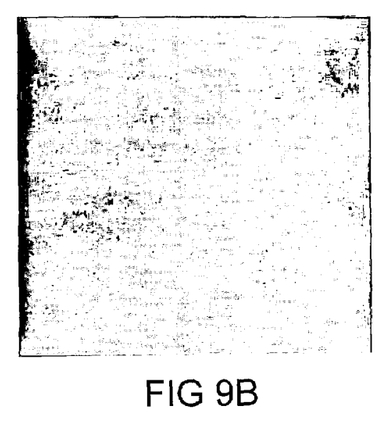
Figure 9C:
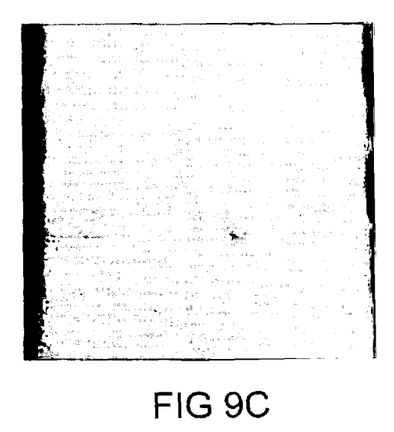
Figure 9D:
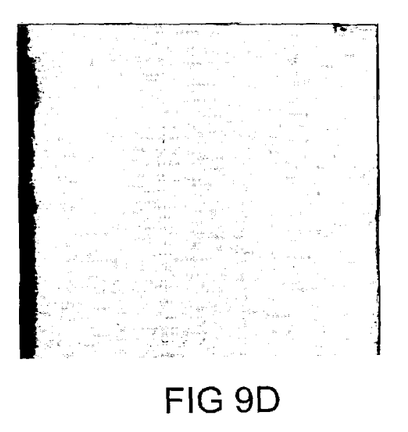

The flux resistance of the calcium-aluminate fibers was evaluated. The term "fluxing" describes a reaction in which a relatively minor component (the flux) acts to drastically lower the melting point of a second material. The fluxing process can significantly compromise the integrity of a thermal insulation material. In the context of high temperature resistant insulation applications, such as, for example, kiln insulation applications, a flux may be present in the fuel that is used to fire the kiln. Two common fluxes encountered in high temperature resistant kiln insulation applications are Na$_2$O and K$_2$O, which are very damaging to refractory ceramic fiber. If Na$_2$O and K$_2$O are present in a sufficient concentration and come into contact with the refractory ceramic fiber, it will cause the refractory ceramic fiber to melt, thereby compromising the integrity of the insulation material.

The flux test is designed to test the aggressiveness of an impurity (the flux) toward the fiber at elevated temperatures. Briefly, a 1 gram sample of a powdered flux is piled in a 1 square inch area on the surface of fiber blanket. The assembly is then heated to 1260° C. (or the desired test temperature) and held for 24 hours. Following the heating, the flux attack on the blanket is determined by visual inspection. Fluxing attack results in melting of the fiber which is in contact with the fluxing agent. The degree of attack can be assessed by the amount of fiber which is melted. The results of the flux testing is reported in Table IV:

TABLE IV

| Example | CaO | Al$_2$O$_3$ | SiO$_2$ | Zr$_2$O | Flux Attack Resistant |
|---|---|---|---|---|---|
| C19 | — | 30% | 54% | 16% | NO |
| C20 | — | 47% | 36% | 17% | NO |
| C21 | — | 45% | 55% | — | NO |
| 22 | 40% | 60% | — | — | YES |
| 23 | 58% | 42% | — | — | YES |
| 24 | 46.5% | 53.5% | — | — | YES |
| 25 | 48.5% | 51.5% | — | — | YES |

Comparative Examples C19 and C20 represent commercially available alumina-zirconia-silica fiber blanket, and Comparative Example C21 represents a commercially available alumino-silicate ceramic fiber blanket The results indicates that the commercially available alumina-zirconia-silica and alumino-silicate blankets were attacked by the Na$_2$O flux. In the case of the fiber refractory ceramic fiber material blankets of the comparative examples, the 1 square inch of blanket which had been in contact with the flux had melted. In stark contrast to the refractory ceramic fiber material of the comparative examples, no flux attack was observes for insulation blankets manufactured from the calcium-aluminate fibers.

According to certain illustrative embodiments, a method of controlling the hydration of calcium-aluminate fibers during production of thermal insulation materials is provided. The hydration of the fibers is controlled through the application of a hydration controlling agent to the surfaces of the fibers. The method for reducing the hydration of fibers in liquids may include adding to said liquid an effective amount of a hydration retarder.

According to certain embodiments, the method for reducing the hydration of calcium-aluminate fibers in liquids comprises adding an effective amount of a hydration retarder to the liquid containing calcium-aluminate fibers which comprise the fiberization product of about 20 weight percent or greater calcia and greater than 0 to about 80 weight percent alumina.

According to other embodiments, the method for reducing the hydration of calcium-aluminate fibers in liquids comprises adding an effective amount of a hydration retarder to the liquid containing calcium-aluminate fibers which comprise the fiberization product of comprising about 20 to about 60 weight percent calcia and about 40 to about 80 weight percent alumina.

According to other embodiments, the method for reducing the hydration of calcium-aluminate fibers in liquids comprises adding an effective amount of a hydration retarder to the liquid containing calcium-aluminate fibers which comprise the fiberization product of about 20 to about 50 weight percent calcia and about 50 to about 80 weight percent alumina.

According to additional embodiments, the method for reducing the hydration of calcium-aluminate fibers in liquids comprises adding an effective amount of a hydration retarder to the liquid containing calcium-aluminate fibers which comprise the fiberization product of about 35 to about 50 weight percent calcia and about 50 to about 65 weight percent alumina.

According to further embodiments, the method for reducing the hydration of calcium-aluminate fibers in liquids comprises adding an effective amount of a hydration retarder to the liquid containing calcium-aluminate fibers which comprise the fiberization product of about 37 to about 50 weight percent calcia and about 50 to about 63 weight percent alumina.

According to other embodiments, the method for reducing the hydration of calcium-aluminate fibers in liquids comprises adding an effective amount of a hydration retarder to the liquid containing calcium-aluminate fibers which comprise the fiberization product of a melt comprising about 50 weight percent calcia and about 50 weight percent alumina.

The following examples are set forth merely to further illustrate the effect of the hydration retarders on calcium-aluminate fibers. The illustrative examples should not be construed as limiting the method of reducing hydration of calcium-aluminate fibers, the method of preparing a thermal insulation board, or the thermal insulation board prepared in according with the method.

Example 26-Control

A calcium-aluminate fiber comprising the fiberization product of 43.5 weight percent calcia, 54.8 weight percent alumina was tested for stability in deionized water. 10 grams of the calcium-aluminate fiber was added to 250 ml of deionized water. The water solution containing the calcium-aluminate fibers was allowed to sit for 1 hour. The deionized water severely degraded to the calcium-aluminate fiber, leaving only a small quantity of non-fibrous residue in the water solution.

Example 27

A calcium-aluminate fiber comprising the fiberization product of 43.5 weight percent calcia, 54.8 weight percent alumina was tested for stability in a solution of zinc chloride. 10 grams of the calcium-aluminate fiber was added to 250 ml of a 10 percent solution of $ZnCl_2$. The solution of $ZnCl_2$ containing the calcium-aluminate fibers was allowed to sit for 1 hour. The solution of $ZnCl_2$ still contained the initial 10 grams of calcium-aluminate fiber. Thus, a 10 percent solution of $ZnCl_2$ did not degrade the structure of the fiber.

Example 28

A calcium-aluminate fiber comprising the fiberization product of 43.5 weight percent calcia, 54.8 weight percent alumina was tested for stability in a solution of sodium citrate. 10 grams of the calcium-aluminate fiber was added to 250 ml of a 10 percent solution of sodium citrate. The solution of sodium citrate containing the calcium-aluminate fibers was allowed to sit for 1 hour. The sodium citrate solution severely degraded to the calcium-aluminate fiber, leaving only a small quantity of non-fibrous residue in the solution.

Example 29

A calcium-aluminate fiber comprising the fiberization product of 43.5 weight percent calcia, 54.8 weight percent alumina was tested for stability in a phosphoric acid solution. 10 grams of the calcium-aluminate fiber was added to 250 ml of a 10 percent solution of phosphoric acid. The solution of phosphoric acid containing the calcium-aluminate fibers was allowed to sit for 1 hour. The phosphoric acid solution severely degraded to the calcium-aluminate fiber, leaving only a small quantity of non-fibrous residue in the solution.

Example 30

A calcium-aluminate fiber comprising the fiberization product of 43.5 weight percent calcia, 54.8 weight percent alumina was tested for stability in a solution of sodium monophosphate. 10 grams of the calcium-aluminate fiber was added to 250 ml of a 10 percent solution of sodium monophosphate. The sodium monophosphate solution containing the calcium-aluminate fibers was allowed to sit for 1 hour. The sodium monophosphate solution still contained the initial 10 grams of calcium-aluminate fiber. Thus, a 10 percent sodium monophosphate solution did not degrade the structure of the fiber.

Example 31

A calcium-aluminate fiber comprising the fiberization product of 43.5 weight percent calcia, 54.8 weight percent alumina was tested for stability in a solution of sodium carboxymethylcellulose. 10 grams of the calcium-aluminate fiber was added to 250 ml of a 0.4 percent solution of sodium carboxymethylcellulose. The sodium carboxymethylcellulose solution containing the calcium-aluminate fibers was allowed to sit for 1 hour. While solution still contained calcium-aluminate fiber, the solution had gelled into a soft, solid mass.

Example 32

10 grams of a calcium-aluminate fiber comprising the fiberization product of 43.5 weight percent calcia, 54.8 weight percent alumina was added to 250 ml of a 5 percent sodium monophosphate solution. The calcium-aluminate fibers were allowed to soak in the sodium monophosphate solution for 1 hour.

The length of the calcium-aluminate fibers was analyzed by the settled volume test. After soaking for 1 hour, the fiber solution was introduced into a graduated cylinder. Water added to the graduated cylinder to 500 ml. The solution was agitated and was allowed to settle for 10 minutes. The highest point of the fiber column was then recorded. This is referred to as the settled volume test, which is an indicator of fiber length.

Example 33

10 grams of a calcium-aluminate fiber comprising the fiberization product of 43.5 weight percent calcia, 54.8 weight percent alumina was added to 250 ml of a 1 percent sodium monophosphate solution. The calcium-aluminate fibers were allowed to soak in the sodium monophosphate solution for 1 hour. After soaking for 1 hour, the fiber solution was analyzed by the settled volume test described in connection with Example 32.

Example 34

10 grams of a calcium-aluminate fiber comprising the fiberization product of 43.5 weight percent calcia, 54.8 weight percent alumina was added to 250 ml of a 0.5 percent sodium monophosphate solution. The calcium-aluminate fibers were allowed to soak in the sodium monophosphate solution for 1 hour. After soaking for 1 hour, the fiber solution was analyzed by the settled volume test described in connection with Example 32.

Example 35-Control 10 grams of a calcium-aluminate fiber comprising the fiberization product of 43.5 weight percent calcia, 54.8 weight percent alumina was added to 250 ml of deionized water. The calcium-aluminate fibers were allowed to soak in the deionized water for 1 hour. After soaking for 1 hour, the fiber solution was analyzed by the settled volume test described in connection with Example 32.

The results of Examples 32-35 are reported in Table V below:

TABLE V

| Example | Sodium Monophosphate Solution (%) | Settled Volume |
|---|---|---|
| 32 | 5% | 470 ml |
| 33 | 1% | 370 ml |
| 34 | 0.5% | 400 ml |
| C35 | $H_2O$ | 10 ml |

The results indicate that the length of the calcium-aluminate fibers was well preserved in each of the sodium monophosphate solutions.

Example 36

10 grams of a calcium-aluminate fiber comprising the fiberization product of 43.5 weight percent calcia, 54.8 weight percent alumina was added to 250 ml of a 5 percent ammonium phosphate solution. The calcium-aluminate fibers were allowed to soak in the ammonium phosphate solution for 1 hour. After soaking for 1 hour, the fiber solution was analyzed by the settled volume test described in connection with Example 32.

Example 37

10 grams of a calcium-aluminate fiber comprising the fiberization product of 43.5 weight percent calcia, 54.8 weight percent alumina was added to 250 ml of a 1 percent ammonium phosphate solution. The calcium-aluminate fibers were allowed to soak in the ammonium phosphate solution for 1 hour. After soaking for 1 hour, the fiber solution was analyzed by the settled volume test described in connection with Example 32.

Example 38

10 grams of a calcium-aluminate fiber comprising the fiberization product of 43.5 weight percent calcia, 54.8 weight percent alumina was added to 250 ml of a 0.5 percent ammonium phosphate solution. The calcium-aluminate fibers were allowed to soak in the ammonium phosphate solution for 1 hour. After soaking for 1 hour, the fiber solution was analyzed by the settled volume test described in connection with Example 32.

Example 39-Control 10 grams of a calcium-aluminate fiber comprising the fiberization product of 43.5 weight percent calcia, 54.8 weight percent alumina was added to 250 ml of deionized water. The calcium-aluminate fibers were allowed to soak in the deionized water for 1 hour. After soaking for 1 hour, the fiber solution was analyzed by the settled volume test described in connection with Example 32.

The results of Examples 36-39 are reported in Table VI below:

TABLE VI

| Example | Ammonium Phosphate Solution (%) | Settled Volume |
|---|---|---|
| 36 | 5% | 500 ml |
| 37 | 1% | 500 ml |
| 38 | 0.5% | 500 ml |
| C39 | $H_2O$ | 10 ml |

The results indicate that the length of the calcium-aluminate fibers was well preserved in each of the ammonium phosphate solutions.

Having established that ammonium phosphate has a protective effect on the calcium-aluminate fibers, vacuum cast insulation board product were produced using a solution of 1 percent ammonium phosphate.

Example 40

A vacuum formed insulation board was formed from a slurry containing the following materials:
 4 gallons of water
 40 g of ammonium phosphate
 600 g of calcium-aluminate fiber
 260 g of colloidal alumina (Wesol D-30)
 40 g of starch (Empersol) dissolved in 1 liter of water Example 41-Comparative A vacuum formed insulation board was formed from a slurry containing the following materials:
 4 gallons of water
 600 g of calcium-aluminate fiber
 260 g of colloidal alumina (Wesol D-30)
 40 g of starch (Empersol) dissolved in 1 liter of water Example 42-Comparative A vacuum formed insulation board was formed from a slurry containing the following materials:
 4 gallons of water
 600 g of blown refractory ceramic fiber
 260 g of colloidal alumina (Wesol D-30)
 40 g of starch (Empersol) dissolved in 1 liter of water After vacuum forming, the boards prepared in accordance with Examples 40-42 were dried overnight at 100° C. The boards were cut and measured for mechanical properties, which are presented in the following Tables:

TABLE VII

| TYPE A DUROMETER | | |
|---|---|---|
| EXAMPLE | SURFACE | INTERIOR |
| 40 | 15-25 | 8-10 |
| 41 | 0 | 0 |
| 42 | 30-45 | 15-20 |

TABLE VIII

| TYPE 00 DUROMETER | | |
|---|---|---|
| EXAMPLE | SURFACE | INTERIOR |
| 40 | 80-82 | 70-80 |
| 41 | 40-65 | 40-50 |
| 42 | 85-90 | 75-80 |

TABLE IX

MODULUS OF RUPTURE

| Example | MODULUS OF RUPTURE (PSI) |
|---|---|
| 40 | 52.7-53.4 |
| 41 | 3.7-4.3 |
| 42 | 60.0-62.6 |

The boards prepared in accordance with Examples 40-42 were tested for mechanical properties and shrinkage following exposure at temperatures of 1000° C. and 1260° C. for 24 hours. The results of the testing are reported in the following Tables:

TABLE X

TYPE A DUROMETER
EXPOSURE TO 1000° C. for 24 hours

| EXAMPLE | HARDNESS |
|---|---|
| 40 | 5-10 |
| 41 | 0 |
| 42 | 10-20 |

TABLE XI

TYPE 00 DUROMETER
EXPOSURE TO 1000° C. for 24 hours

| EXAMPLE | HARDNESS |
|---|---|
| 40 | 70-80 |
| 41 | 35-60 |
| 42 | 70-80 |

TABLE XII

SHRINKAGE AFTER EXPOSURE TO 1000° C. for 24 hours

| EXAMPLE | SHRINKAGE (%) |
|---|---|
| 40 | 1.6 |
| 41 | 3.3 |
| 42 | 0.3 |

TABLE XIII

MODULUS OF RUPTURE
EXPOSURE TO 1000° C. for 24 hours

| EXAMPLE | MODULUS OF RUPTURE (PSI) |
|---|---|
| 40 | 53.7 |
| 41 | 0 |
| 42 | 33 |

TABLE XIV

TYPE A DUROMETER
EXPOSURE TO 1260° C. for 24 hours

| EXAMPLE | HARDNESS |
|---|---|
| 40 | 5-15 |
| 41 | 0 |
| 42 | 5-10 |

TABLE XV

TYPE 00 DUROMETER
EXPOSURE TO 1260° C. for 24 hours

| EXAMPLE | HARDNESS |
|---|---|
| 40 | 70-90 |
| 41 | 60-70 |
| 42 | 70-80 |

TABLE XVI

SHRINKAGE AFTER EXPOSURE TO 1260° C. for 24 hours

| Example | SHRINKAGE (%) |
|---|---|
| 40 | 4.4 |
| 41 | 7.6 |
| 42 | 2 |

TABLE XVII

MODULUS OF RUPTURE
EXPOSURE TO 1260° C. for 24 hours

| EXAMPLE | MODULUS OF RUPTURE (PSI) |
|---|---|
| 40 | 58.4 |
| 41 | 0 |
| 42 | 37.9 |

As indicated in the above Tables, thermal insulation boards comprising calcium-aluminate fibers possess good shrinkage and strength characteristics. Accordingly, thermal insulation containing the calcium-aluminate fibers may be utilized in thermal insulation applications as a replacement for standard mineral wool or alumino-silicate refractory ceramic fiber. Thermal insulation material containing the calcium-aluminate fibers may be utilized for thermal insulation applications that require resistance of 1100° C. or greater. Moreover, thermal insulation material containing the calcium-aluminate fibers may be utilized for thermal insulation applications that require resistance up to about 1200° C. Without limitation, thermal insulation containing the calcium-aluminate fibers may be utilized to thermally insulate heating vessels, such as furnaces, in the chemical processing, petroleum processing, ceramic processing, glass processing, metals production and processing industries, or in the automotive, aerospace, appliance, and fire protection industries.

The calcium-aluminate fibers may be provided in the form of bulk fibers. Additionally, the calcium-aluminate fibers may be incorporated into a wide variety of acoustical, electrical, or thermal insulation articles or products. Without limitation, for example, the calcium-aluminate fibers may be processed into high temperature resistant fiber containing blankets, including needled and stitched blankets, boards, braids, cloths, expanding papers, non-expanding papers, fabrics, felts, cast shapes, modules, bonded modules, mats, packings, ropes, tapes, sleeving, vacuum cast shapes, woven textiles, workable compositions, including high temperature resistant caulks, cements, coatings, mortars, pumpable compositions, putties, and moldable compositions.

The inorganic fiber compositions, method for producing the inorganic fiber composition, the various inorganic fiber containing articles, and method of insulating articles are not limited to the embodiments described above, but include all variations, modifications, and equivalent embodiments. The embodiments that are disclosed separately are not necessarily in the alternative, as the various embodiments of the invention may be combined to provide the desired characteristics. Therefore, the inorganic fiber, fiber containing articles, and methods for preparing the fiber and using the fiber as thermal insulation should not be limited to any single embodiment, but rather construed in breadth and scope in accordance with the recitation of the attached claims.

We claim:

1. A low shrinkage, high temperature resistant inorganic fiber having a use temperature of 1100° C. or greater, wherein at least 90 weight percent of said fiber comprises a fiberization product of greater than 50 to about 80 weight percent calcia and about 20 to less than 50 weight percent alumina.

2. The inorganic fiber of claim 1, wherein at least 90 weight percent of said fiber comprises the fiberization product of greater than 50 to about 60 weight percent calcia and from about 40 to less than 50 weight percent alumina.

3. The inorganic fiber of claim 1, wherein at least 90 weight percent of said fiber comprises the fiberization product of about 60 to about 80 weight percent calcia and about 20 to about 40 weight percent alumina.

4. The inorganic fiber of claim 1, wherein at least 90 weight percent of said fiber comprises the fiberization product of greater than 50 to about 70 weight percent calcia and about 30 to less than 50 weight percent alumina.

5. The inorganic fiber of claim 1, containing about 5 weight percent or less silica.

6. The inorganic fiber of claim 1, containing about 2 weight percent or less silica.

7. The inorganic fiber of claim 1, containing substantially no alkali metal oxide.

8. The inorganic fiber of claim 1, containing less than about 1 weight percent iron oxide, calculated as $Fe_2O_3$.

9. The inorganic fiber of claim 1, wherein the fiber exhibits a linear shrinkage of 5 percent or less when exposed to 1260° C. for 24 hours.

10. An inorganic fiber containing article comprising at least one of bulk fiber, blankets, needled blankets, papers, felts, cast shapes, vacuum cast forms, or compositions, said fiber containing article comprising the fiberization product of claim 1.

* * * * *